(12) United States Patent
Tsukamoto

(10) Patent No.: US 12,314,618 B2
(45) Date of Patent: May 27, 2025

(54) IMAGE INSPECTION DEVICE, IMAGE FORMING SYSTEM, AND NON-TRANSITORY STORAGE MEDIUM COMPRISING A HARDWARE PROCESSOR THAT EXECUTES CONTINUITY INSPECTION OF AN IDENTIFIER IN AN INSPECTION REGION IN A READ IMAGE ACROSS A PLURALITY OF JOBS

(71) Applicant: KONICA MINOLTA, INC., Tokyo (JP)

(72) Inventor: Yasumasa Tsukamoto, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/345,239

(22) Filed: Jun. 30, 2023

(65) Prior Publication Data

US 2024/0012595 A1   Jan. 11, 2024

(30) Foreign Application Priority Data

Jul. 8, 2022  (JP) ................. 2022-110424

(51) Int. Cl.
*G06F 3/12*      (2006.01)
*H04N 1/00*   (2006.01)

(52) U.S. Cl.
CPC ............ *G06F 3/126* (2013.01); *G06F 3/1207* (2013.01); *G06F 3/1241* (2013.01); *G06F 3/1259* (2013.01)

(58) Field of Classification Search
CPC ...... G06F 3/126; G06F 3/1207; G06F 3/1241; G06F 3/1259; G06F 3/1234
USPC .................................................. 358/1.11–1.18
See application file for complete search history.

(56) References Cited

U.S. PATENT DOCUMENTS

| | | | |
|---|---|---|---|
| 2015/0181049 A1* | 6/2015 | Morishita | H04N 1/001 358/1.15 |
| 2020/0096925 A1* | 3/2020 | Ikuta | G06F 3/1259 |
| 2021/0118115 A1* | 4/2021 | Tsukamoto | G06T 7/001 |
| 2022/0082974 A1* | 3/2022 | Iwadate | G03G 15/502 |

FOREIGN PATENT DOCUMENTS

| | | | |
|---|---|---|---|
| JP | 2005251050 A | * | 9/2005 |
| JP | 2007241413 A | * | 9/2007 |
| JP | 2013197665 A | * | 9/2013 |
| JP | 2019202485 A | * | 11/2019 |
| JP | 2021053819 A | * | 4/2021 |
| JP | 2023159012 A | * | 10/2023 ............. G06F 18/22 |

* cited by examiner

*Primary Examiner* — Chad Dickerson
(74) *Attorney, Agent, or Firm* — BUCHANAN, INGERSOLL & ROONEY PC

(57) ABSTRACT

An image inspection device that inspects a read image of a recording medium on which an image is formed based on a job, the image inspection device includes a hardware processor. The hardware processor executes a continuity inspection of an identifier in an inspection region in the read image. The hardware processor executes the continuity inspection across a plurality of jobs to be inspected.

18 Claims, 16 Drawing Sheets

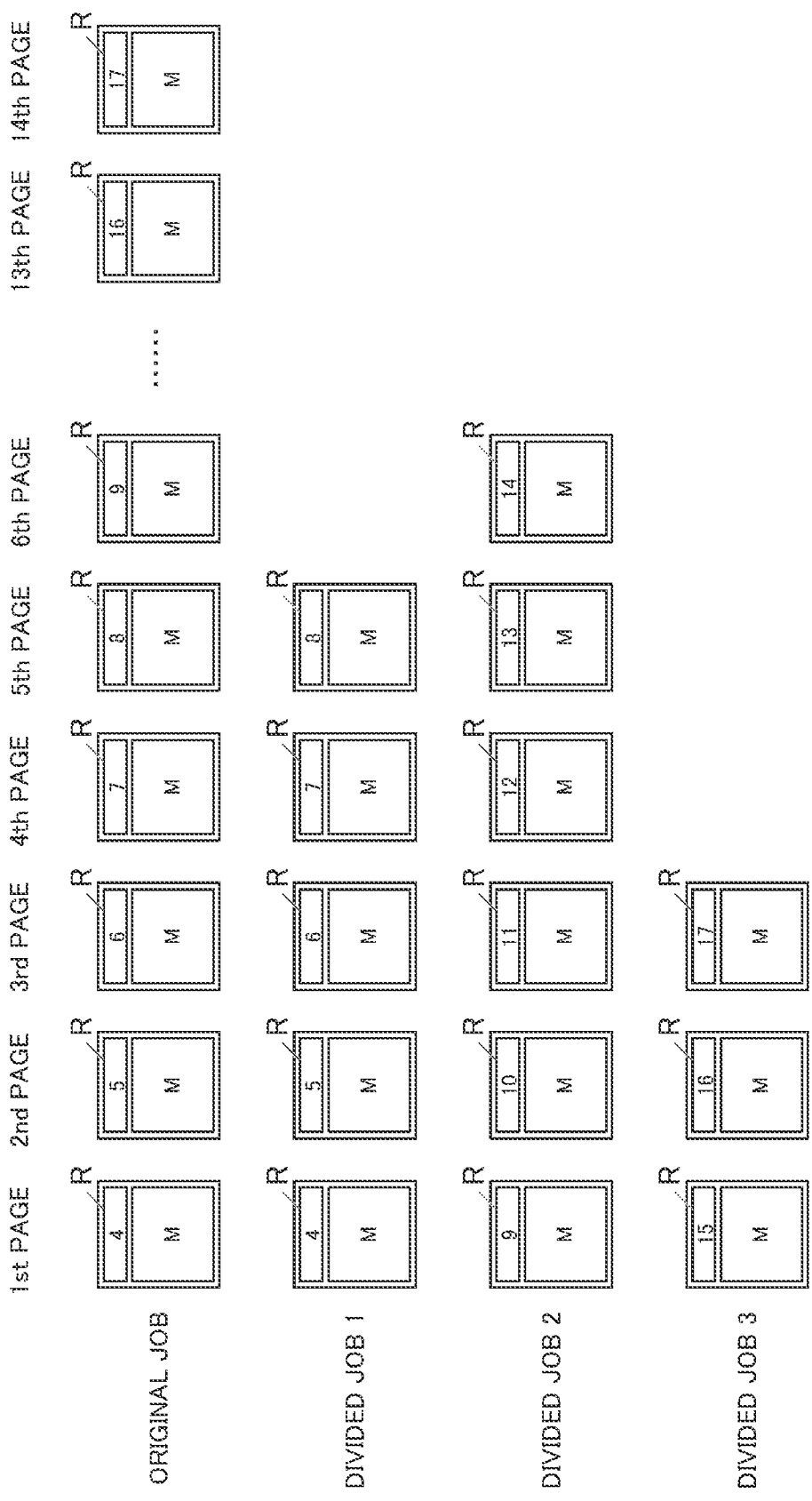

181a

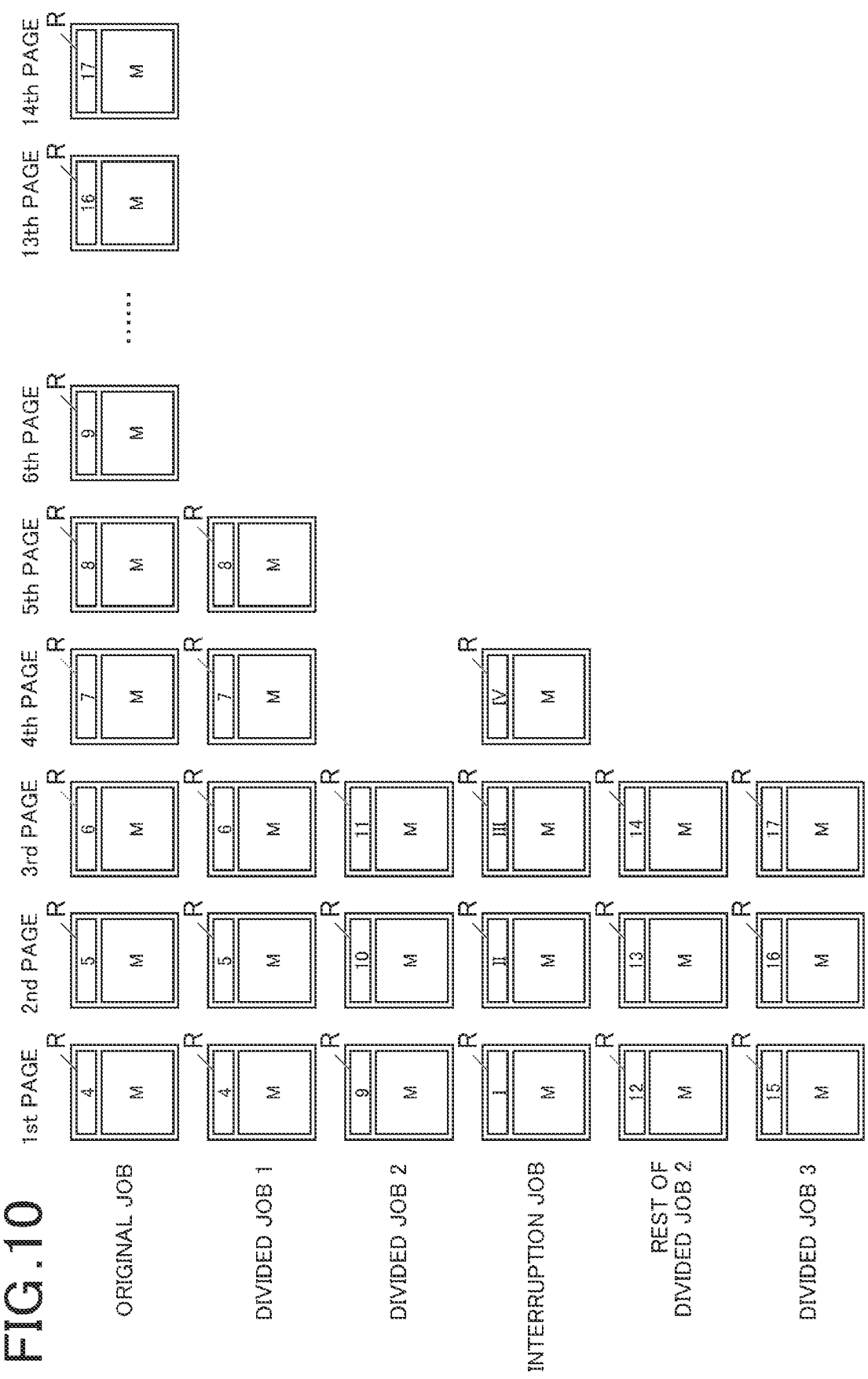

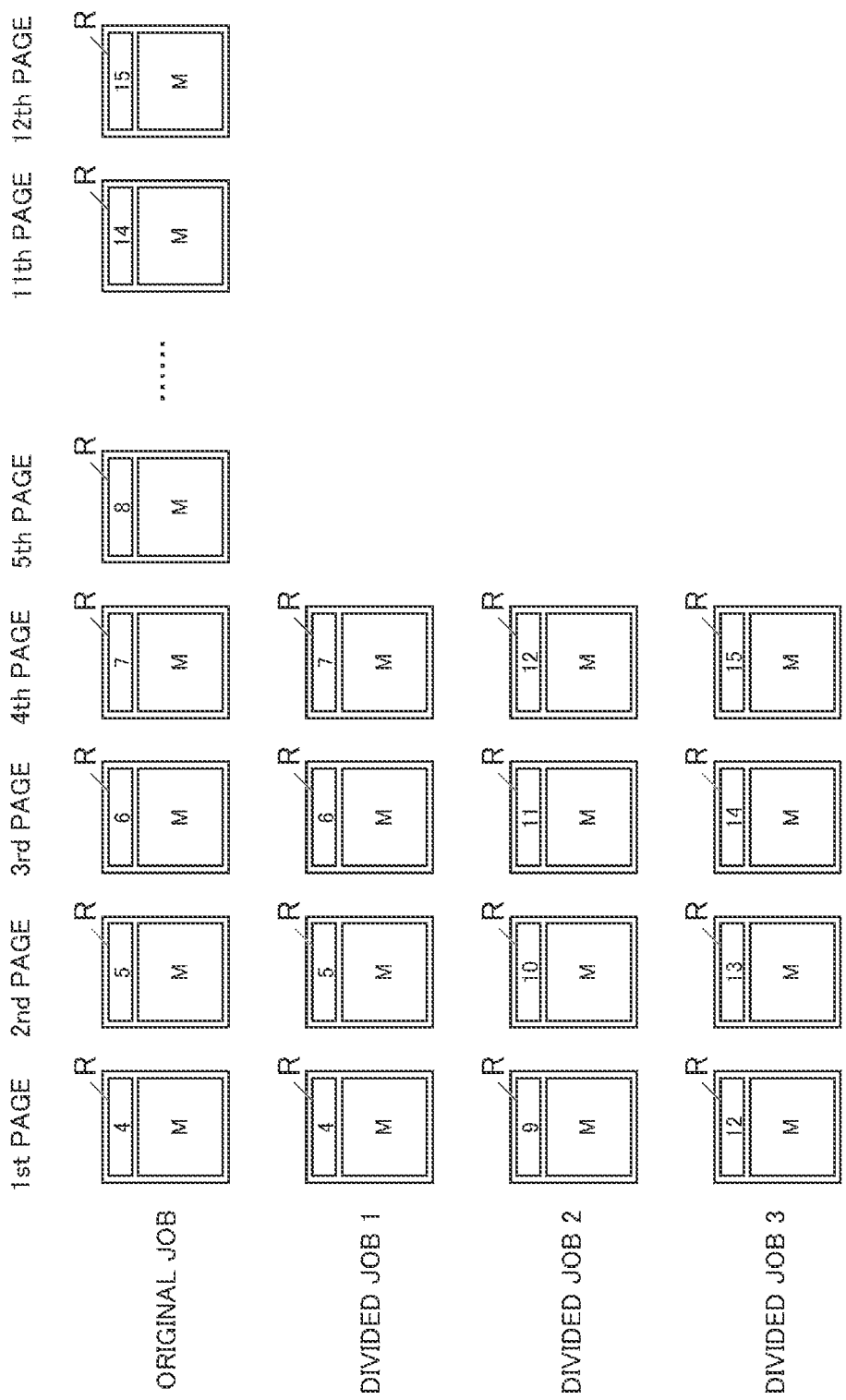

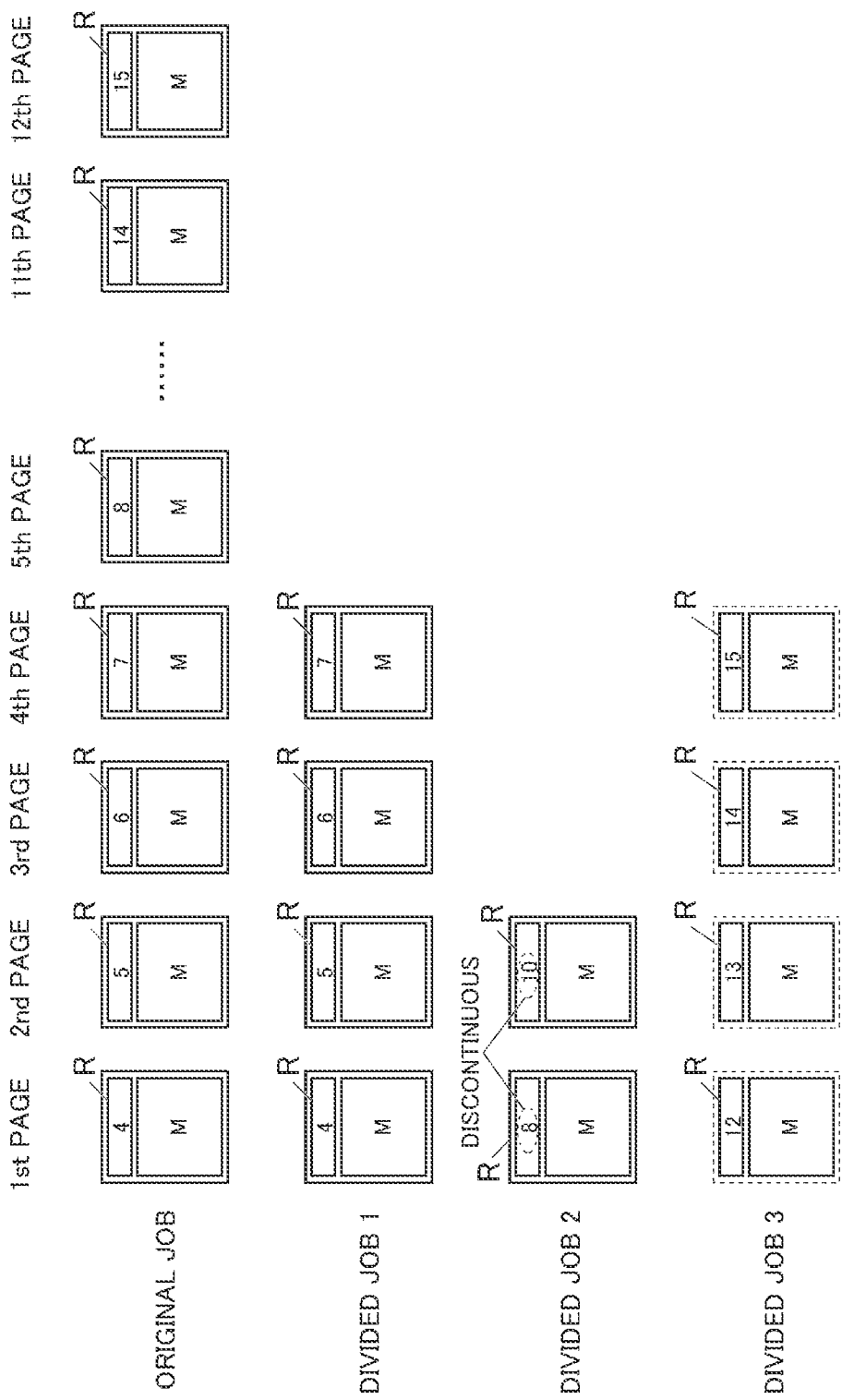

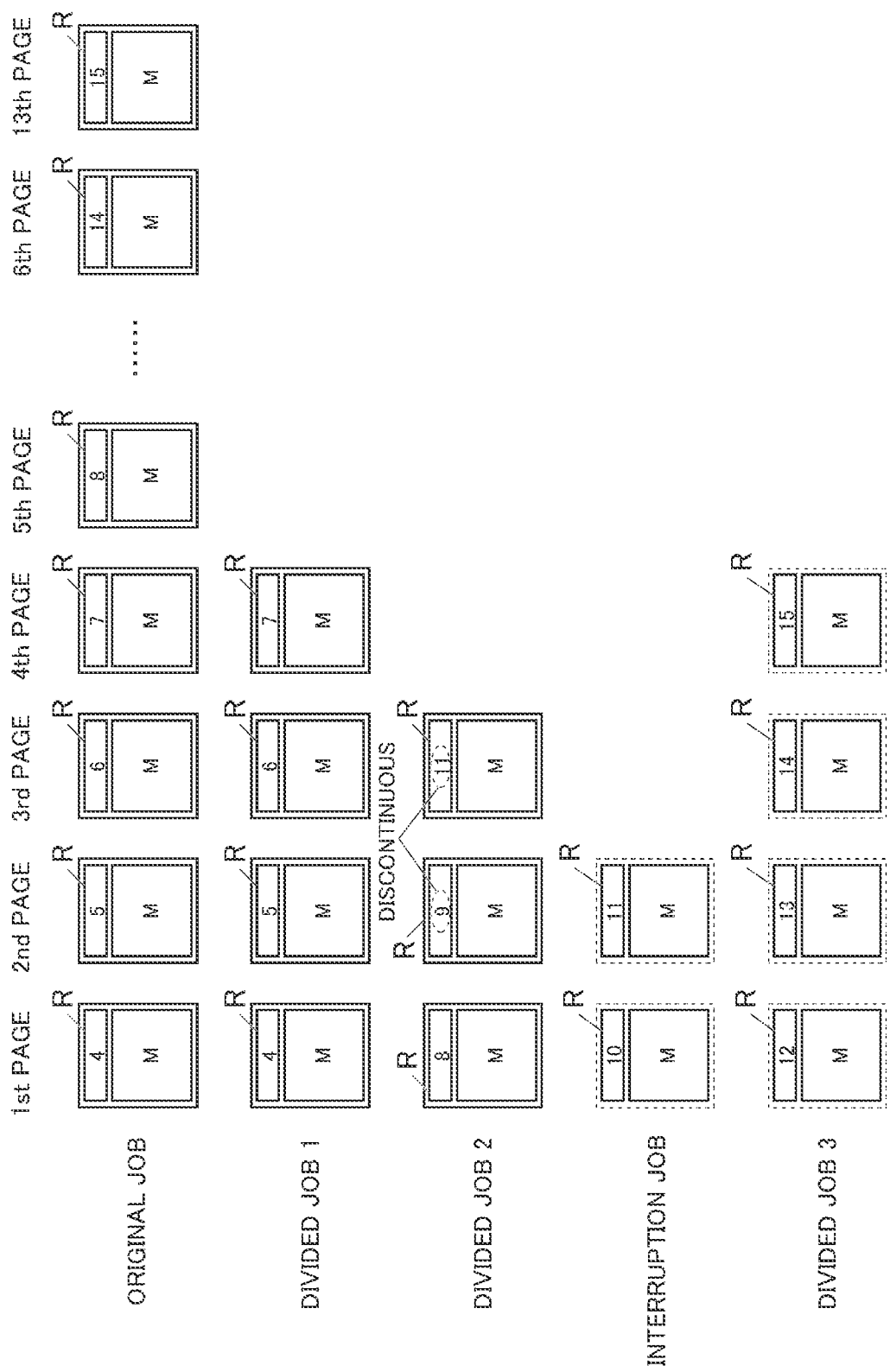

IMAGE INSPECTION DEVICE, IMAGE FORMING SYSTEM, AND NON-TRANSITORY STORAGE MEDIUM COMPRISING A HARDWARE PROCESSOR THAT EXECUTES CONTINUITY INSPECTION OF AN IDENTIFIER IN AN INSPECTION REGION IN A READ IMAGE ACROSS A PLURALITY OF JOBS

REFERENCE TO RELATED APPLICATIONS

The entire disclosure of Japanese Patent Application No. 2022-110424 filed on Jul. 8, 2022, including description, claims, drawings and abstract is incorporated herein by reference in its entirety.

TECHNICAL FIELD

The present invention relates to an image inspection device, an image forming system, and a storage medium.

DESCRIPTION OF THE RELATED ART

Conventionally, there is an image inspection device that reads a printed material on which an image and an identifier that identifies the printed material are printed based on a job, and performs continuity inspection to check whether or not the identifier in the read image is continuous. Whether or not the identifier is continuous is whether or not the identifier on the printed material is in order, for example, in an ascending order or a descending order.

For example, Japanese Unexamined Patent Application Publication No. 2021-053819 discloses the following image inspection device. Specifically, the image inspection device sets a specific inspection region in an image formed by an image forming means as a target of a specific inspection. Next, the image inspection device determines whether or not the numerical value acquired by decoding the specific inspection region in the read data acquired by reading the image formed on each recording medium is sorted in an ascending order or a descending order.

When a failure occurs in the image forming system, maintenance is required, or a running job must be stopped, the printed material that has been printed halfway through the job becomes wastepaper, and the job must be run again from the beginning.

Therefore, in order to prevent the running job from being stopped in the middle and executed again from the beginning, the job may be divided in advance before start of printing. In such a case, the continuity inspection is sometimes desired to be performed on a job before division.

SUMMARY OF THE INVENTION

However, the continuity inspection described in Japanese Unexamined Patent Application Publication No. 2021-053819 is performed on a job-by-job basis. Therefore, in a case where a job is divided as described above, there has been a problem that the continuity inspection cannot be performed on the job before the division.

An object of the present invention is to provide an image inspection device, an image forming system, and a storage medium that enable the suitable continuity inspection on divided jobs.

To achieve at least one of the abovementioned objects, according to an aspect of the present invention, an image inspection device reflecting one aspect of the present invention inspects a read image of a recording medium on which an image is formed based on a job, and the inspection device includes:

a hardware processor that executes a continuity inspection of an identifier in an inspection region in the read image, wherein the hardware processor executes the continuity inspection across a plurality of jobs to be inspected.

To achieve at least one of the abovementioned objects, according to an aspect of the present invention, an image forming system reflecting one aspect of the present invention includes:

the image inspection device according to claim 1; and an image forming section that forms an image on the recording medium.

To achieve at least one of the abovementioned objects, a non-transitory storage medium storing a computer-readable program according to an aspect of the present invention causes a computer of an image inspection device that inspects a read image of a recording medium on which an image is formed based on a job to:

execute continuity inspection of an identifier included in an inspection region of the read image; and execute the continuity inspection across a plurality of jobs to be inspected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 5 is a diagram illustrating an example of a continuity inspection;

FIG. 10 is a diagram illustrating an example in a case where an interruption job is acquired;

FIG. 12 is a diagram illustrating a modification example where a job is divided;

FIG. 13 is a diagram illustrating a modification example where an identifier is discontinuous; and FIG. 14 is a diagram illustrating a modification example where an identifier is discontinuous.

DETAILED DESCRIPTION

Hereinafter, embodiments of the present invention will be described in detail with reference to the drawings. However, the scope of the invention is not limited to the disclosed embodiments.

[Configuration of Image Forming System]

Figure 1:
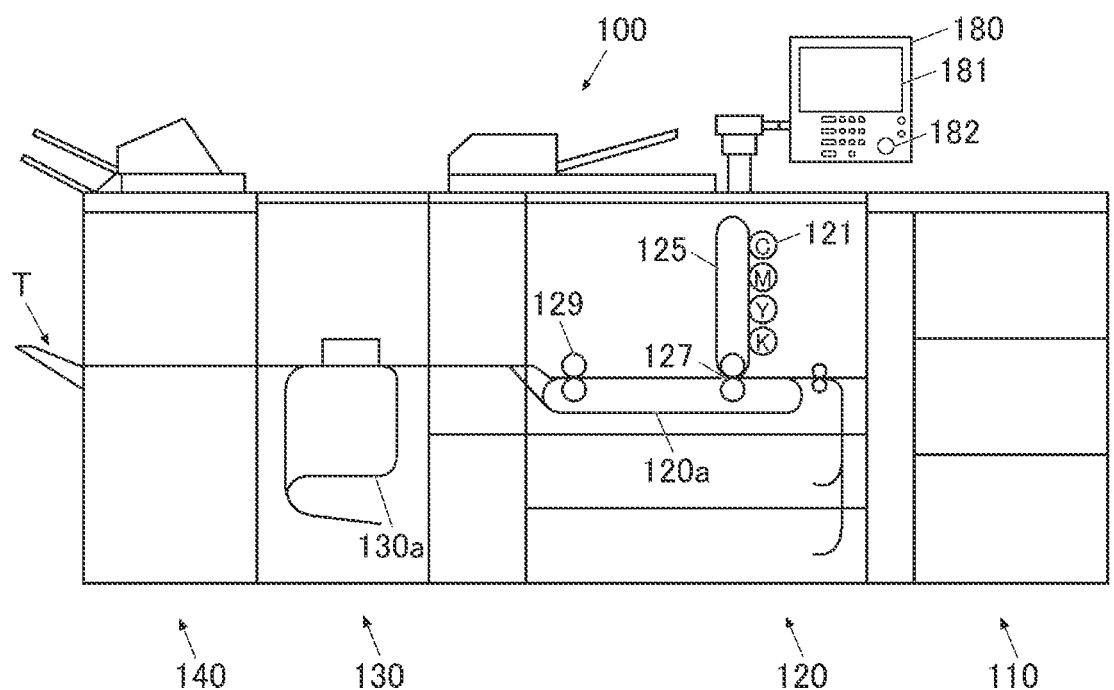
FIG. 1 is a view illustrating a schematic configuration of an image forming system.
Figure 2:
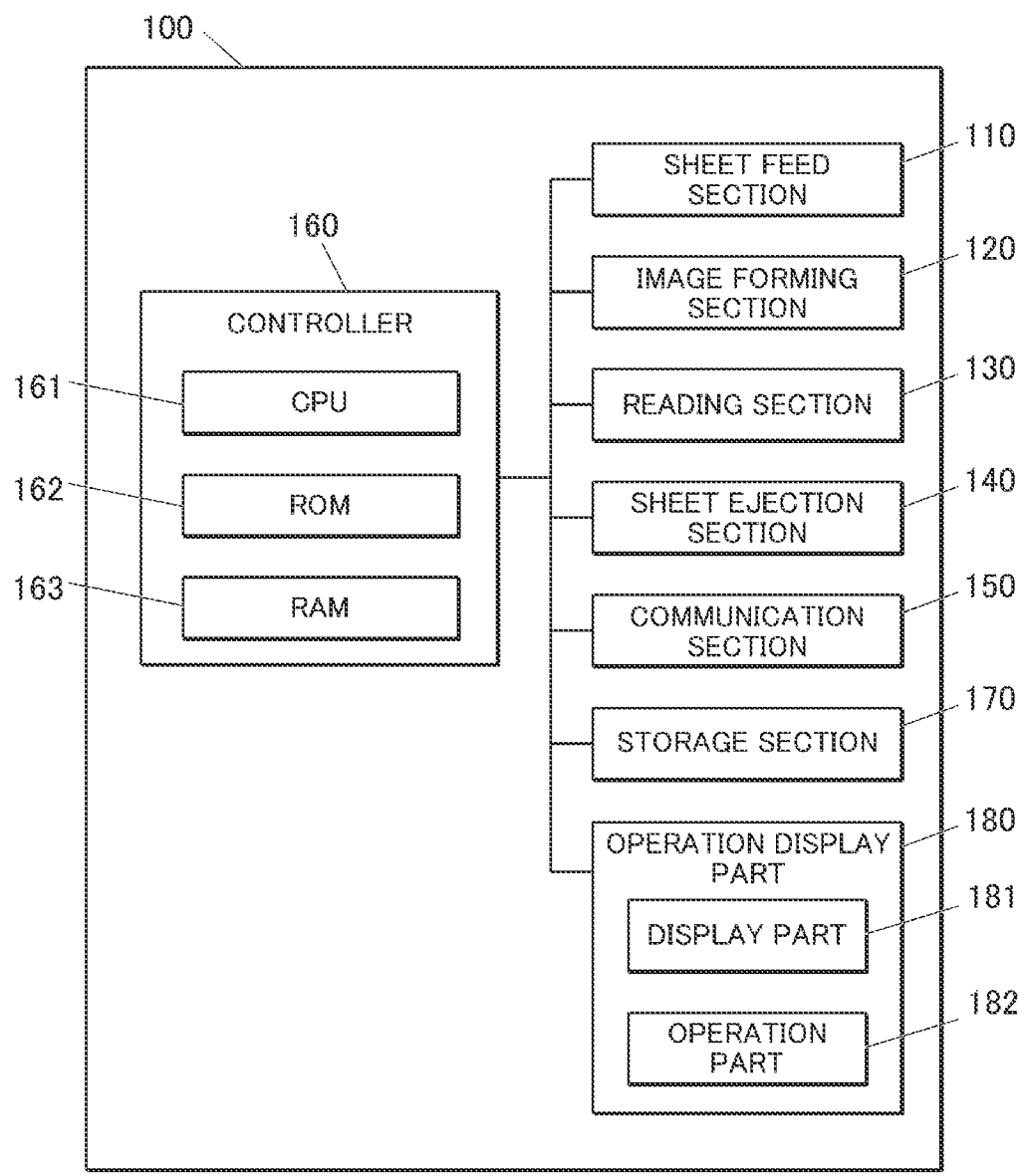
FIG. 2 is a block diagram illustrating a control configuration in the image forming system.

FIG. 1 is a view illustrating a schematic configuration of an image forming system 100. FIG. 2 is a block diagram illustrating a control configuration in the image forming system 100.

The image forming system 100 includes a sheet feed section 110, an image forming section 120, a reading section 130, a sheet ejection section 140, a communication section 150, a controller 160 (hardware processor), a storage section 170, and an operation display part 180.

The sheet feed section 110 includes a plurality of sheet feed trays for storing sheets and feeds a sheet to the image forming section 120.

The image forming section 120 forms an image on a sheet by electrophotographic method based on an input job or image data.

The image forming section 120 includes a photosensitive drum 121, a charging section (not shown), an exposure section (not shown), a developing section (not shown), an intermediate transfer belt 125, a primary transfer section (not shown), a secondary transfer section 127, a cleaning section (not shown), and a fixing section 129.

The photosensitive drum 121 carries a toner image.

The charging section charges the photosensitive drum 121.

The exposure section exposes the charged photosensitive drum 121 to light to remove charges.

The developing section develops the toner image.

The intermediate transfer belt 125 carries the toner image transferred from the photosensitive drum 121.

The primary transfer section transfers the toner image on the photosensitive drum 121 onto the intermediate transfer belt 125.

The secondary transfer section 127 transfers the toner image on the intermediate transfer belt 125 to a sheet.

The cleaning section removes the toner image remaining on the intermediate transfer belt 125.

The fixing section 129 applies heat and pressure to the toner image transferred onto the sheet to fix the toner image onto the sheet.

The image forming section 120 includes a reverse conveyance path 120a that reverses front/back of the sheet on which the image is formed.

The image forming section 120 is not limited one that forms an image using the above-described electrophotographic method. The image forming section 120 may form an image on a sheet by, for example, an inkjet method or other known methods.

Figure 3:
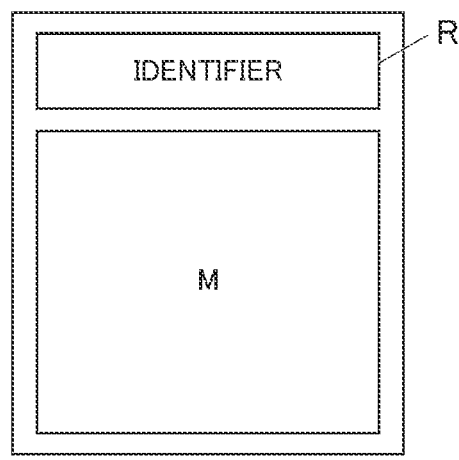
FIG. 3 is a diagram illustrating an example of a job image and an identifier formed on a sheet.

As illustrated in FIG. 3, the image forming section 120 forms, on a sheet, an identifier in addition to the job image M based on the input job or image data.

The identifier is formed in an inspection region R set in the sheet, such that the order of the job image M can be identified during image formation. Examples of the identifier include numerals, barcodes, QR codes (registered trademark), hiragana, katakana, alphabets from "A" to "Z", combinations of alphabets such as "AA" to "ZZ", combinations of alphabets and numerals such as "A0001" to "Z9999", and so on. The identifier may have any information based on which the order of the job image M can be identified. The size, color, and shape of the identifier to be formed are not limited.

The reading section 130 is located downstream of the image forming section 120 in the sheet conveyance direction.

The reading section 130 reads an image formed on a sheet by the image forming section 120, generates a read image, and outputs the read image to the controller 160.

The reading section 130 includes, for example, a color line sensor in which optical sensors such as charge coupled devices (CCDs) are one dimensionally arranged.

A reverse conveyance path 130a that reverses the front and back of the sheet is located in the vicinity of the reading section 130. Since the reverse conveyance path 130a reverses the front and back of the sheet, the reading section 130 can read both sides of the sheet.

The sheet ejection section 140 includes a sheet ejection roller that ejects the sheet conveyed from the reading section 130 and a sheet ejection tray T on which the sheets ejected by the sheet ejection roller are loaded and stored, and ejects the sheet on which the image is formed.

The communication section 150 includes a communication control card such as a local area network (LAN) card, for example.

The communication section 150 transmits and receives various kinds of data to and from an external device (for example, a personal computer) connected to a communication network such as a LAN or a wide area network (WAN).

The controller 160 includes a central processing unit (CPU) 161, a read only memory (ROM) 162, a random access memory (RAM) 163, and the like. The CPU 161 reads a program corresponding to the content of processing from the ROM 162, develops the program in the RAM 163, and controls the operation of each section of the image forming system 100 in cooperation with the developed program. At this time, the CPU 161 refers to various kinds of data stored in the storage section 170.

The controller 160 controls communication section 150 to receive, for example, a job or image data transmitted from the external device. Next, the controller 160 controls the image forming section 120 to form an image on a sheet on the basis of the received job or image data.

The reading section 130 reads a sheet (recording medium) on which an image has been formed based on a job, and the controller 160 inspects the image read by the reading section 130. That is, the controller 160 functions as an image inspection device.

The controller 160 executes continuity inspection (described later) of the identifier included in the inspection region R in the read image output by the reading section 130.

The storage section 170 includes, for example, a hard disk drive (HDD) or a semiconductor nonvolatile memory.

The storage section 170 stores various programs including a system program and a processing program to be executed by the controller 160, and data required for execution of these programs.

The operation display part 180 includes a display part 181 and an operation part 182.

The display part 181 includes a display screen and displays various kinds of information on the screen based on a control signal from the controller 160.

The operation part 182 is used by a user to input various instructions, converts an input operation into an operation signal, and outputs the operation signal to the controller 160.

(Operation of Image Forming System)

Next, the operation of the image forming system 100 in the present embodiment will be described.

Figure 4A:
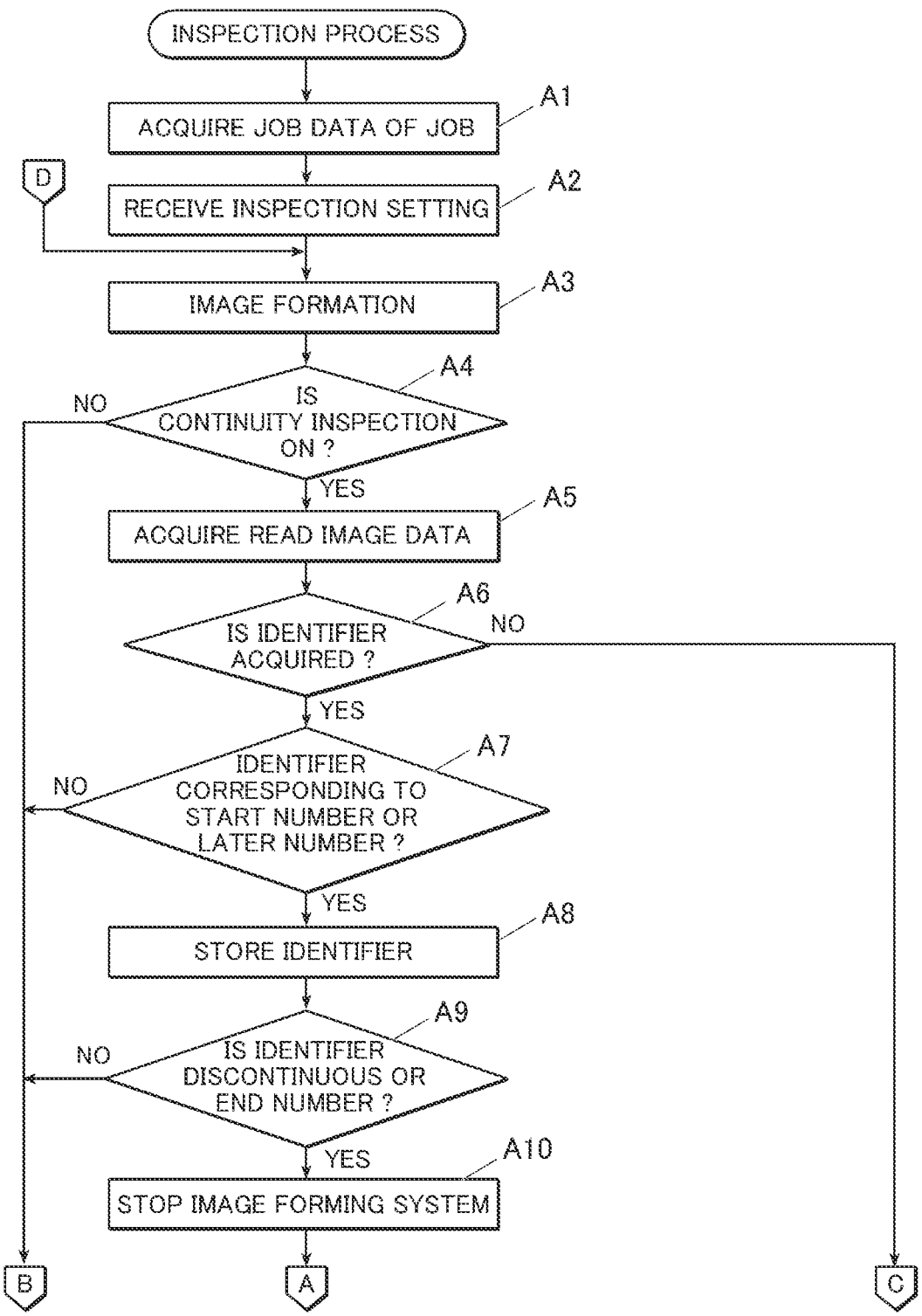
FIG. 4A is a flowchart illustrating a flow of an inspection process.
Figure 4B:
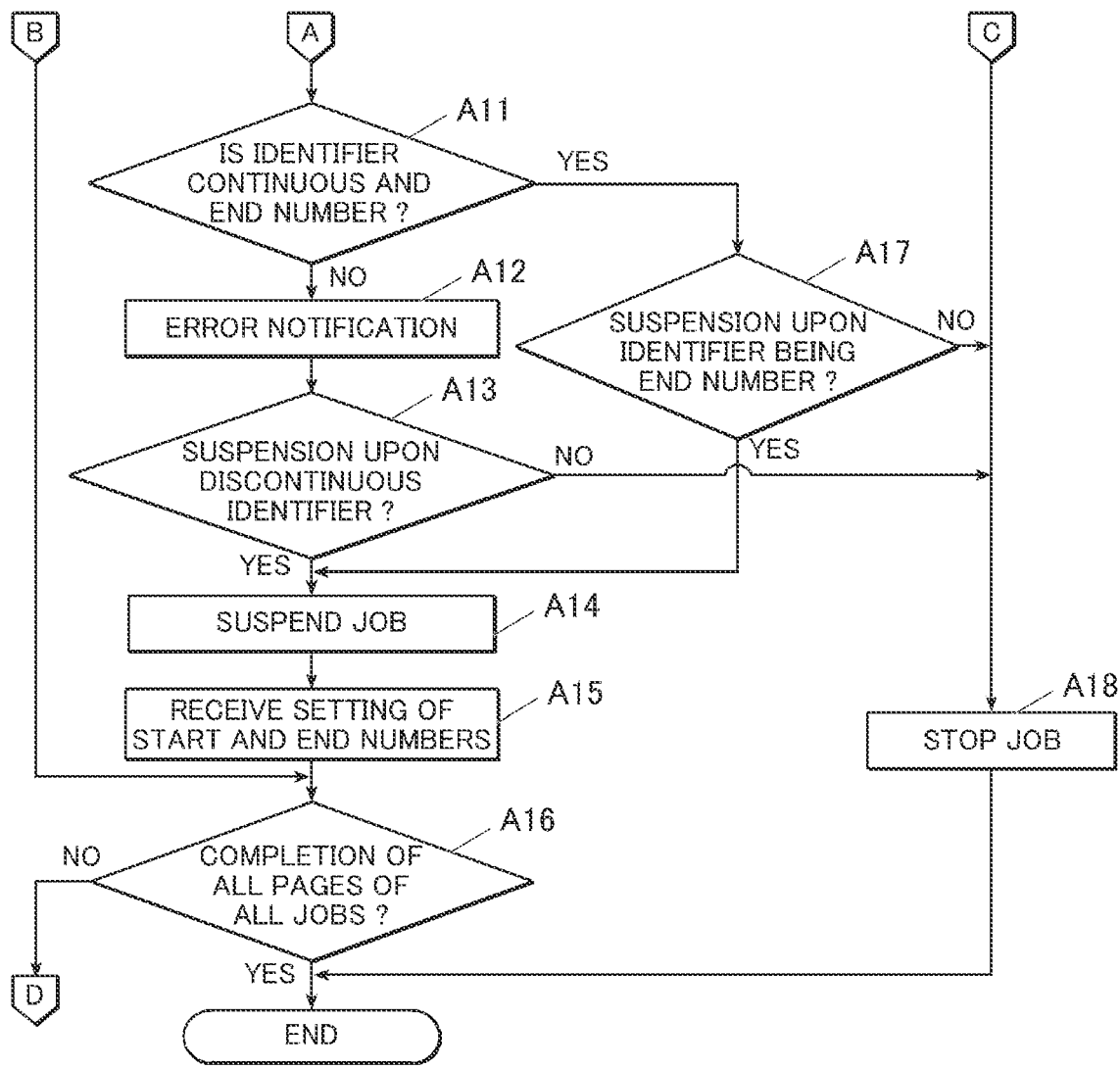
FIG. 4B is a flowchart illustrating a flow of an inspection process.

FIG. 4A and FIG. 4B illustrate flowcharts of an inspection process executed by the controller 160 of the image forming system 100.

The controller 160 executes the inspection process in cooperation with a program stored in the storage section 170.

The controller 160 executes the inspection process to perform a continuity inspection for inspecting, based on the read image by the reading section 130, whether or not the identifiers formed on respective sheets are sorted in an ascending order or a descending order. Whether or not the identifiers on respective sheets are sorted in an ascending order or a descending order is whether or not the identifiers are continuous.

(Inspection Process)

The controller 160 acquires job data by receiving a job from the external device (Step A1). The controller 160 may acquire the job data by acquiring a job from the storage section 170.

In Step A1 according to the present embodiment, the controller 160 receives a plurality of jobs. The plurality of jobs are, for example, divided jobs 1 to 3 acquired by dividing an original job illustrated in FIG. 5 into three in advance.

Next, the controller 160 receives an inspection setting(s) from the user via the operation part 182 (Step A2).

More specifically, the controller 160 receives a setting as to whether or not to perform the continuity inspection in a job. Whether or not to perform the continuity inspection is ON/OFF of the continuity inspection.

When the continuity inspection is set to ON, the controller 160 receives a setting as to whether or not to perform the continuity inspection across a plurality of jobs.

That is, the controller 160 receives a setting as to whether or not to perform the continuity inspection across a plurality of jobs as inspection targets. As a result, the controller 160 functions as a third receiver.

FIG. 5 illustrates an example of the continuity inspection.

FIG. 5 illustrates the original job and divided jobs. The original job is divided into the three divided jobs. In other words, the original job includes processing of pages with numbers "4" through "17" as identifiers. The divided job 1 includes processing of pages with numbers "4" to "8" as identifiers. The divided job 2 includes processing of pages with numbers "9" to "14" as identifiers. The divided job 3 includes processing of pages with numbers "15" to "17" as identifiers.

If the continuity inspection is set to ON, the controller 160 determines whether or not the identifiers formed on the sheets are continuous in each of the divided jobs 1 to 3.

If the continuity inspection is set to be performed across a plurality of jobs, the controller 160 further determines whether or not the first page of the divided job 2 is continuous with the last page of the divided job 1. The last page of the divided job 1 is a page with an identifier "8" in FIG. 5. The first page of the divided job 2 is a page with an identifier "9" in FIG. 5. The controller 160 further determines whether or not the first page of the divided job 3 is continuous with the last page of the divided job 2. The last page of the divided job 2 is a page with an identifier "14" in FIG. 5. The first page of the divided job 3 is a page with an identifier "15" in FIG. 5.

When the continuity inspection is set to ON, the controller 160 receives the setting of the shape, orientation, and the like of the inspection region R in the sheet.

When the continuity inspection is set to ON, the controller 160 functions as a first receiver that receives the setting of a start number of the identifier at which the continuity inspection is started. The controller 160 also functions as a second receiver that receives the setting of an end number of the identifier at which the continuity inspection is ended.

The controller 160 may receive setting of only the start number. In this case, the controller 160 performs the continuity inspection from the start number until, for example, the job is completed or stopped. The time until the job is completed is a time until the continuity inspection of the last page of the job is completed.

The controller 160 may receive setting of only the end number. In this case, the controller 160 performs the continuity inspection from, for example, the number of the identifier acquired in the first read image after the start of the job to the end number.

The controller 160 may not receive either the start number or the end number. In this case, the controller 160 performs the continuity inspection, for example, from the number of the identifier first acquired in the read image after starting the job, for example, until the job is completed or stopped.

If the continuity inspection is set to ON, the controller 160 receives a setting as to whether or not to stop or suspend the job in response to the result of the continuity inspection that the identifier is discontinuous.

If the end number is set and the the continuity inspection is executed up to the end number, the controller 160 receives a setting as to whether to stop the job or suspend the job.

The job data may include inspection setting information. In this case, the controller 160 acquires the inspection setting information from the job data and receives various settings.

Next, the controller 160 controls the image forming section 120 to form a job image and an identifier on a sheet that has been fed from the sheet feed section 110 (Step A3).

Next, the controller 160 determines whether or not the continuity inspection is set to ON in the inspection setting received in Step A2 (Step A4).

If the continuity inspection is set to ON (Step A4; YES), the controller 160 acquires the read image data from the reading section 130 (Step A5).

Next, based on the read image data acquired in Step A5, the controller 160 determines whether or not the identifier formed on the sheet has been acquired (Step A6).

An image of a numeral or a character string may be formed as the identifier. In this case, the controller 160 performs an optical character recognition (OCR) process on the inspection region R in the read image data and acquires the numeral or the character string.

An image of a barcode may be formed as the identifier. The barcode is a one-dimensional barcode, a two-dimensional barcode such as a QR code, or the like. In this case, the controller 160 performs a predetermined decoding process for acquiring the information represented by the barcode on the inspection region R in the read image data and acquires the information represented by the barcode. The information represented by the barcode is a numerical value, a character string, or the like.

If an identifier is acquired (Step A6; YES), the controller 160 determines whether or not the identifier acquired in Step A6 corresponds to the start number received in Step A2 or a number in a later order than the start number (Step A7).

If the identifier acquired in Step A6 corresponds to the start number or a number in a later order than the start number (Step A7; YES), the controller 160 stores the identifier acquired in Step A6 in the storage section 170 (Step A8).

Next, the controller 160 determines whether or not the identifier acquired in Step A6 is continuous with the identifier acquired and stored in the storage section 170 last time. Being acquired last time means being acquired from the one previous page. If the continuity inspection is set to be performed across a plurality of jobs according to the inspection setting received in Step A2, the controller 160 determines whether or not the identifier is continuous across the plurality of jobs. If the continuity inspection is not set to be performed across a plurality of jobs, the controller 160 determines whether or not the identifier is continuous within one job only.

Next, the controller 160 determines whether or not the identifier acquired in Step A6 is the end number according to the setting received in Step A2.

Next, the controller 160 determines whether or not the identifier is either discontinuous or equal to the end number (Step A9).

If the identifier is either discontinuous or equal to the end number (Step A9; YES), the controller 160 stops the operation of the image forming system 100 (Step A10).

Next, the controller 160 determines whether or not the identifier is continuous and equal to the end number (Step A11).

Figure 6:
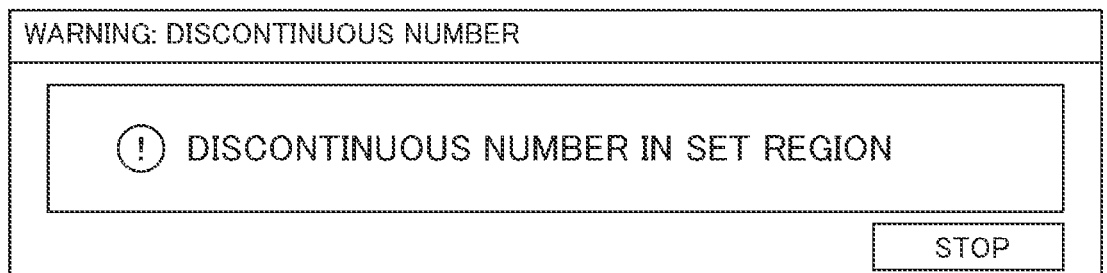
FIG. 6 is a diagram illustrating an example of an error notification screen.

If the identifier is not continuous or equal to the end number (Step A11; NO), that is, if the identifier is discontinuous, the controller 160 performs error notification (Step A12). Specifically, the controller 160 causes the display part 181 to display an error notification screen 181a illustrated in FIG. 6.

Next, the controller 160 determines whether or not the inspection setting received in Step A2 includes suspension of the job in response to the result of the continuity inspection that the identifier is discontinuous (Step A13).

If the setting includes the suspension of the job upon the identifier being discontinuous (Step A13; YES), the controller 160 suspends the job (Step A14). That is, the controller 160 suspends the image formation by the image forming section 120 and suspends the continuity inspection.

Next, with respect to the job suspended in Step A14, the controller 160 receives the settings of the start number and the end number from the user via the operation part 182 (Step A15). The start number is a number for resuming the continuity inspection. The end number is a number for ending the resumed continuity inspection. That is, the controller 160 functions as a fourth receiver that receives the settings of the start number and the end number of the identifier.

Figure 7:
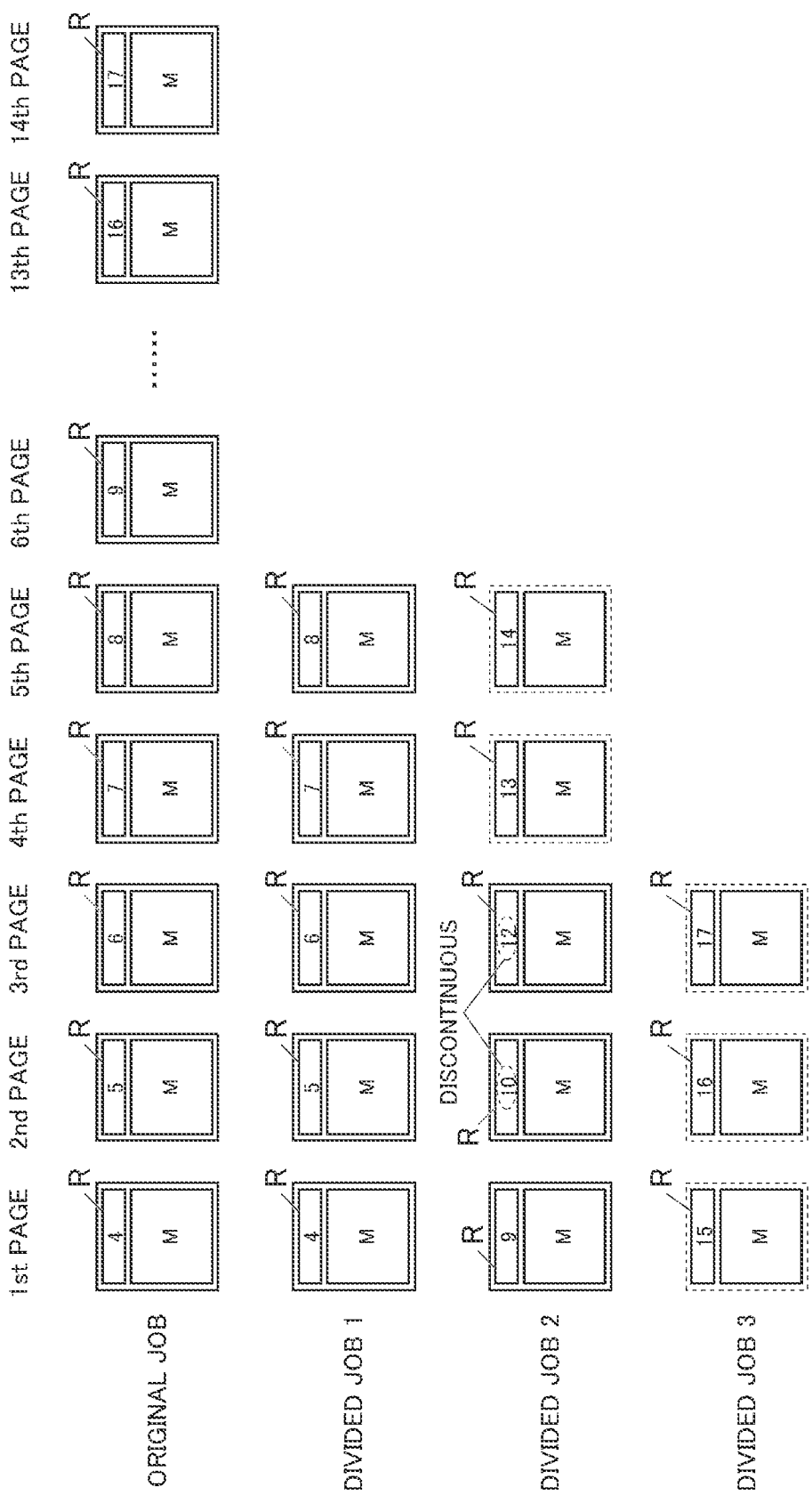
FIG. 7 is a diagram illustrating an example of a case where an identifier is discontinuous.

FIG. 7 shows an example of a case where the identifier is discontinuous.

In the divided job 2 in the example illustrated in FIG. 7, the identifier "10" is formed on the second page, the identifier "12" is formed on the third page, and the identifiers are discontinuous. In this case, the controller 160 determines that the identifier on the third page of the divided job 2 is discontinuous, and then stops the operation of the image forming system 100.

Next, in Step A15, the controller 160 receives the setting of the start number for resuming the continuity inspection and the end number for ending the resumed continuity inspection. In the example illustrated in FIG. 7, the user sets, for example, "12" as the start number and "17" as the end number.

In Step A15, the controller 160 may receive the setting of only the start number. In this case, the controller 160 performs the continuity inspection from the start number until, for example, the job is completed or stopped.

The controller 160 may receive setting of only the end number. In this case, for example, the controller 160 performs the continuity inspection from the number of the identifier acquired on the page where the job is suspended to the end number.

The controller 160 may not receive either the start number or the end number. In this case, the controller 160 performs the continuity inspection from, for example, the number of the identifier acquired from the page where the job is suspended until, for example, the job is completed or stopped.

Next, the controller 160 determines whether or not image formation on all pages has been completed for all jobs received in Step A1. Next, when the continuity inspection is set to ON in the inspection setting, the controller 160 determines whether or not the continuity inspection has been completed for all the jobs (Step A16).

If the above-described process has been completed for all the pages of all the jobs (Step A16; YES), the controller 160 ends the present process.

If there is a page for which the above process has not been completed (Step A16; NO), the controller 160 moves the present process to Step A3 and continues the process.

That is, when the suspended job is resumed, the controller 160 resumes the image formation of a page next to the page on which the job is suspended, and resumes the continuity inspection from the start number set in Step A15. That is, in the example illustrated in FIG. 7, the controller 160 resumes the image formation from the page to which the identifier "13" is given, and resumes the continuity inspection from, for example, the page to which the identifier "12" is given. In this case, the controller 160 may form an image on the page with the identifier "11" after the completion of the divided job 3.

If the continuity inspection is not set to ON (Step A4; NO), the controller 160 moves the present process to Step A16.

If the identifier acquired in Step A6 does not correspond to the start number or a number in a later order than the start number (Step A7; NO), the controller 160 moves the present process to Step A16.

If the identifier is continuous and is not equal to the end number (Step A9; NO), the controller 160 moves the present process to Step A16.

If the identifier formed on the sheet is not acquired based on the read image data (Step A6; NO), the controller 160 stops the job (Step A18) and ends the present process.

If the setting does not include suspension of the job upon the identifier being discontinuous as a result of performing the continuity inspection (Step A13; NO), the controller 160 stops the job (Step A18). Next, the controller 160 ends the present process.

If the identifier is continuous and equal to the end number (Step A11; YES), the controller 160 determines whether or not the inspection setting received in Step A2 includes suspension of the job after the continuity inspection is executed up to the end number (Step A17). The state in which the continuity inspection has been executed up to the end number is a state in which the identifier acquired in Step A6 corresponds to the end number.

If the setting includes suspension of the job after the continuity inspection is executed up to the end number (Step A17; YES), the controller 160 moves the present process to Step A14 and suspends the job.

If the setting does not include interruption of the job after the continuity inspection is performed to to the end number (Step A17; NO), the controller 160 moves the present process to Step A18 and stops the job.

Next, the resuming process executed by the controller 160 of the image forming system 100 will be described. The resuming process is performed when the power of the image forming system 100 in the off state is turned on.

Figure 8:
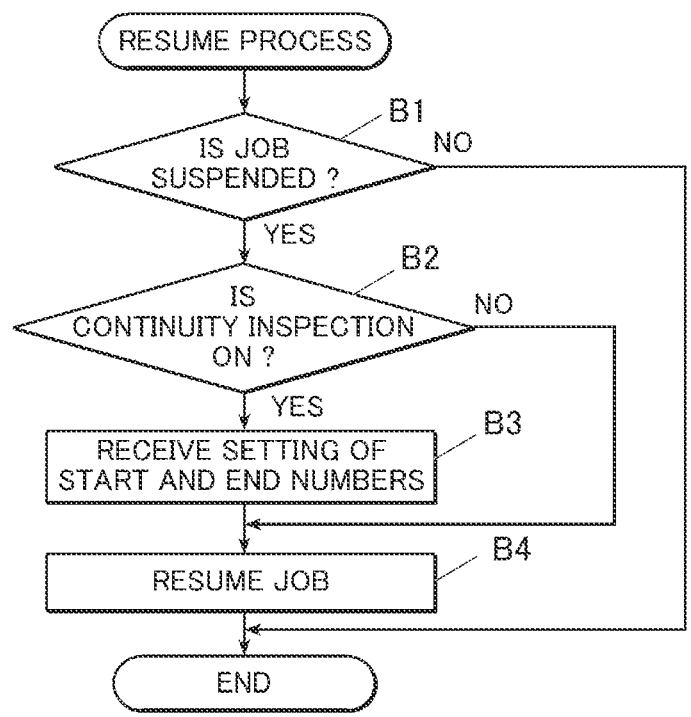
FIG. 8 is a flowchart illustrating a flow of a resuming process.

FIG. 8 illustrates a flowchart of the resuming process.

The controller 160 executes the resuming process in cooperation with a program stored in the storage section 170.

(Resuming Process)

The controller 160 determines whether or not the job had been suspended when the power of the image forming system 100 was turned off last time (Step B1).

For example, a job had been suspended when the power was turned off after Step A14 in the above inspection process. If the job had been suspended (Step B1; YES), the controller 160 determines whether or not the continuity inspection is set to ON in the inspection setting of the suspended job (Step B2).

If the continuity inspection is set to ON (Step B2; YES), the controller 160 receives the setting of the start number and the end number from the user via the operation part 182 for the suspended job (Step B3). The start number is a number for resuming the continuity inspection. The end number is a number for ending the resumed continuity inspection.

In Step B3, similarly to Step A15 of the inspection process, the controller 160 may receive the setting of only the start number. The controller 160 may receive the setting of only the end number. The controller 160 may not receive either the start number or the end number.

Next, the controller 160 resumes the job (Step B4) and ends the present process. In Step B4, the controller 160 resumes the image formation from the page next to the suspended page as the resumption of the job, and executes the continuity inspection from the start number to the end number according to the setting received in Step B3.

If it is set in the inspection setting for the job to be resumed that the continuity inspection is to be performed across a plurality of jobs, the controller 160 determines whether or not the identifier is continuous across the plurality of jobs.

If it is not set in the inspection setting for the job to be resumed that the continuity inspection is to be performed across a plurality of jobs, the controller 160 determines whether or not the jobs are continuous only in one job.

If the continuity inspection had not been set to ON in the inspection setting of the suspended job (Step B2; NO), the controller 160 moves the present process to Step B4, and resumes the image formation on the page next to the suspended page as the resumption of the job.

If the job had not been suspended when the power of image forming system 100 was turned off last time (Step B1; NO), the controller 160 ends the present process.

Next, an interruption process executed by the controller 160 of the image forming system 100 in parallel with the above inspection process will be described.

Figure 9:
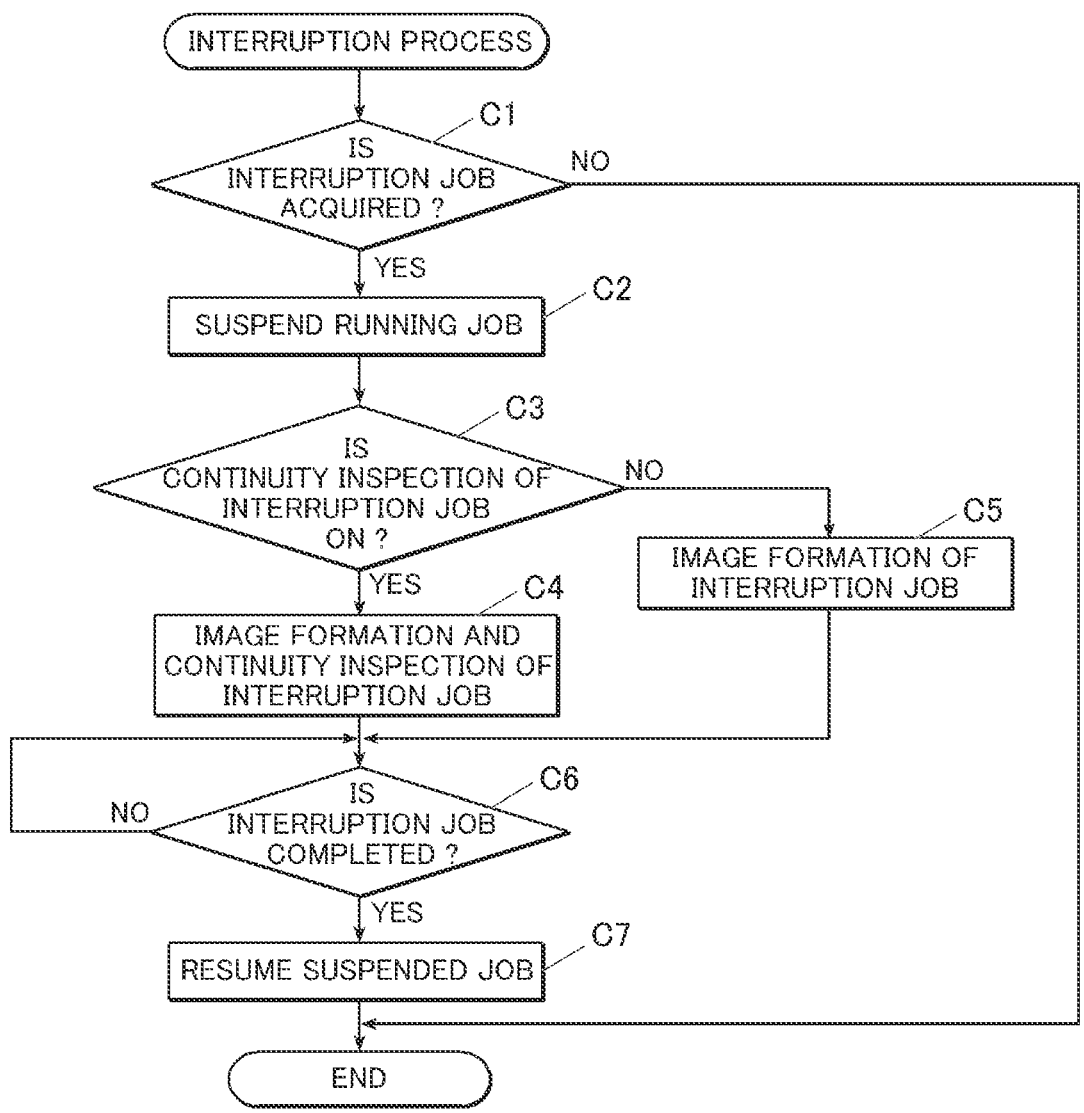
FIG. 9 is a flow chart illustrating a flow of an interruption process.

FIG. 9 shows a flowchart of the interruption process.

The controller 160 executes the interruption process in cooperation with a program stored in the storage section 170.

(Interruption Process)

The controller 160 determines whether or not an interruption job has been received from an external device, or whether or not an interruption job has been input by a user via the operation part 182. That is, the controller 160 determines whether or not an interruption job has been acquired (Step C1).

When the interruption job has been acquired (Step C1; YES), the controller 160 suspends the running job in the inspection process (Step C2).

Next, the controller 160 determines whether or not the continuity inspection is set to ON in the inspection setting for the interruption job acquired in Step C1 (Step C3).

If the continuity inspection is set to ON (Step C3; YES), the controller 160 executes image formation of the interruption job and continuity inspection (Step C4).

If the continuity inspection is not set to ON (Step C3; NO), the controller 160 executes only the image formation of the interruption job (Step C5).

Next, the controller 160 determines whether or not the formation of the image of the interruption job is completed, and whether or not the continuity inspection is completed in a case where the continuity inspection is set to ON. That is, the controller 160 determines whether or not the interruption job has been completed (Step C6).

If the interruption job has not been completed (NO in Step C6), the controller 160 returns the present process to Step C6 and waits until the interruption job is completed.

If the interruption job has been completed (Step C6; YES), the controller 160 resumes the job suspended in Step C2 (Step C7), and ends the interruption process.

In Step C7, the controller 160 resumes formation of an image from a page next to the suspended page. If the continuity inspection is set to ON in the inspection setting of the suspended job, the controller 160 resumes the continuity inspection from the suspended page.

FIG. 10 illustrates an example of a case where an interruption job is acquired.

In the example illustrated in FIG. 10, the controller 160 acquires an interruption job after performing the image formation and the continuity inspection of the third page of the divided job 2 in the inspection process described above. The third page of the divided job 2 is a page with an identifier "11".

In this case, the controller 160 suspends the divided job 2 at the third page. That is, the controller 160 suspends the image formation and the continuity inspection. Next, the controller 160 executes formation of an image of the interruption job, and executes the continuity inspection when the continuity inspection is set to ON. Thereafter, the controller 160 resumes the suspended divided job 2. That is, the controller 160 resumes the image formation from a page next to the suspended page. The page next to the suspended page is a page with an identifier "12". Next, the controller 160 resumes the continuity inspection from the suspended page. The suspended page is the page with an identifier "11".

Modification Example

Next, a modification example of the above-described embodiment will be described.

Hereinafter, differences from the above embodiment will be mainly described.

Figure 11A:
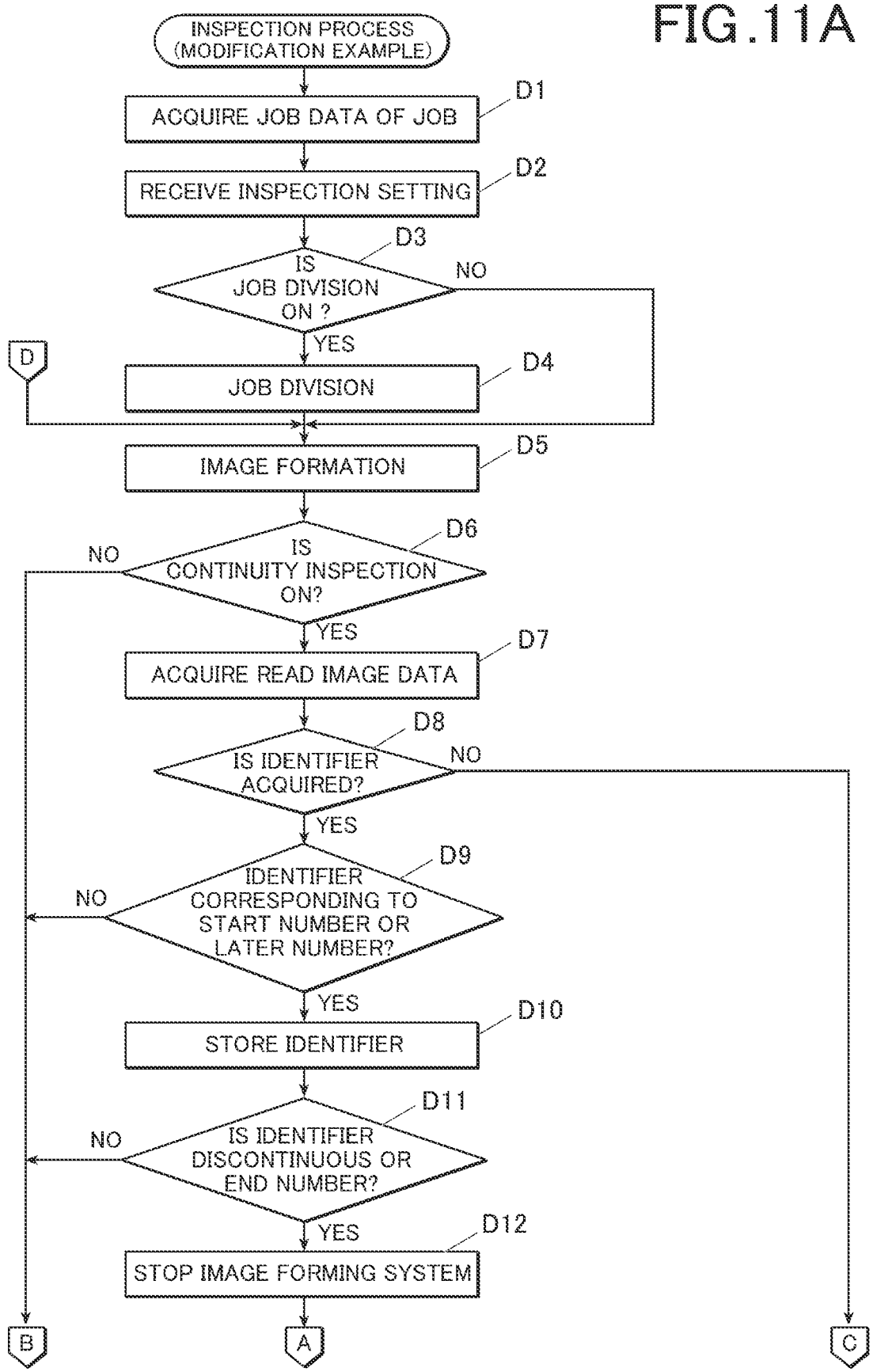
FIG. 11A is a flowchart illustrating a flow of an inspection process of a modification example.
Figure 11B:
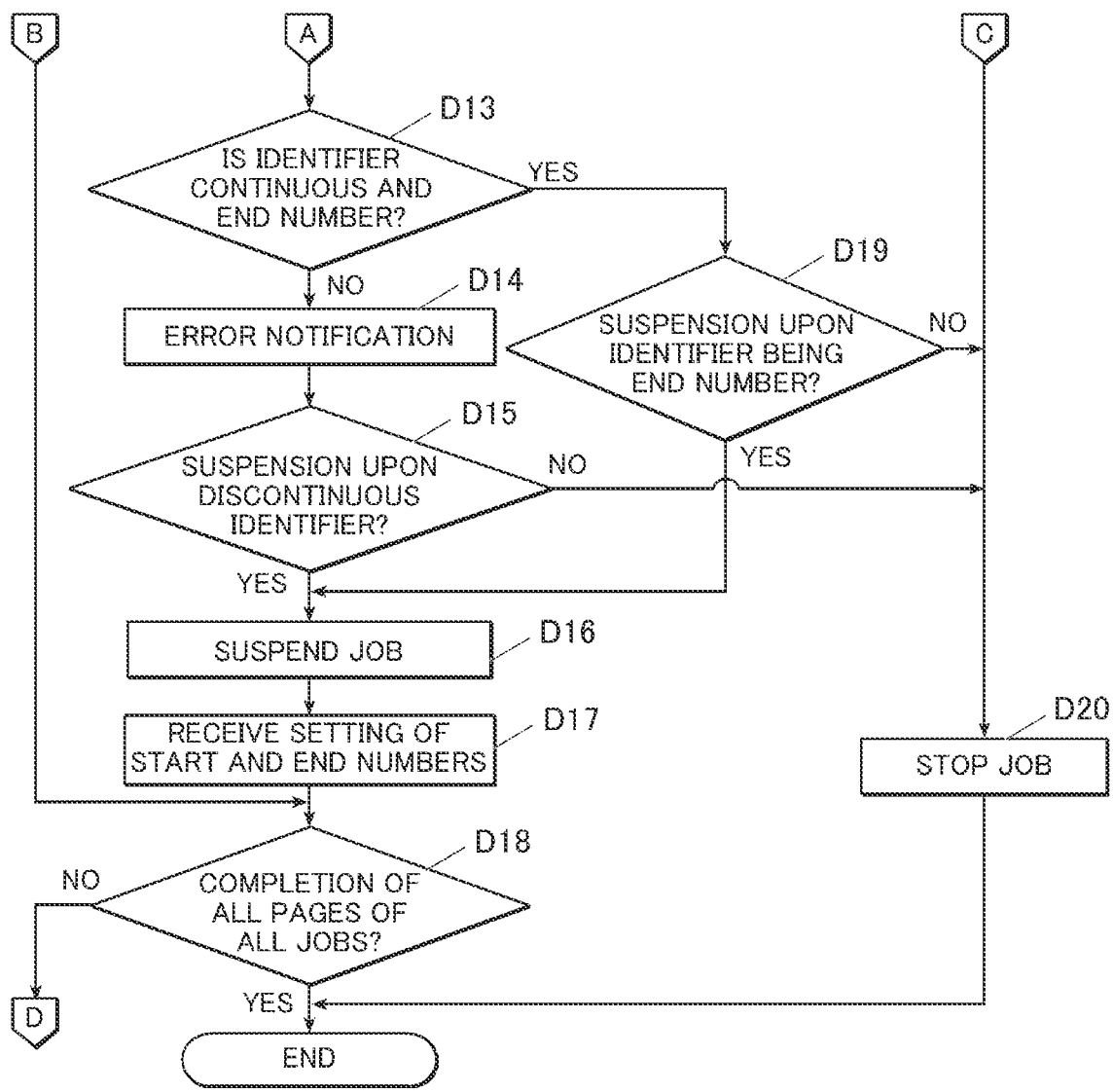
FIG. 11B is a flowchart illustrating a flow of an inspection process of a modification example.

Flowcharts of the inspection process of the present modification example are illustrated in FIGS. 11A and 11B.

(Inspection Process of Modification Example)

In the inspection process of the present modification example, the controller 160 acquires job data by receiving a job from an external device (Step D1). The controller 160 may acquire the job data by acquiring a job from the storage section 170.

In Step D1 of the present modification example, the controller 160 receives a plurality of jobs or one job. The plurality of jobs are, for example, the divided jobs 1 to 3 illustrated in FIG. 5. The one job is, for example, the original job illustrated in FIG. 5.

Next, the controller 160 receives an inspection setting(s) from the user via the operation part 182 (Step D2).

In Step D2 of the present modification example, the controller 160 receives the setting received in Step A2 of the inspection process in the above embodiment. The controller 160 further receives a setting as to whether or not to divide the job acquired in Step D1. Whether or not to divide a job is ON/OFF of job division.

If the job division is set to ON, the controller 160 receives a setting for dividing a job, i.e., the number of pages in each divided job. As a result, the controller 160 functions as a fifth receiver.

The job data may include inspection setting information including a setting of ON/OFF of job division and a setting of the number of pages in each divided job. In this case, the controller 160 acquires the inspection setting information and receives various settings from the job data.

Next, the controller 160 determines whether or not the job division is set to ON in the inspection setting received in Step D2 (Step D3).

If the job division is set to ON (Step D3; YES), the controller 160 divides the job received (acquired) in Step D1 based on setting of the number of pages in each divided job received (acquired) in Step D2 (Step D4).

FIG. 12 illustrates an example of the dividing a job.

In the example illustrated in FIG. 12, the controller 160 receives an original job of 12 pages in Step D1 and "4 pages" as the setting of the number of pages in each divided job in Step D2. In this case, in Step D4, the controller 160 divides the original job into divided jobs of four pages each.

If the job division is not set to ON in the inspection setting (Step D3; NO), the controller 160 moves the present process to Step D5.

Next, the controller 160 performs processes in Steps D5 to D20 that are similar to those in Steps A3 to A18 of the inspection process of the above embodiment, and ends the present process.

In Step D11, the controller 160 determines whether or not the identifier acquired in Step D8 is continuous with the identifier acquired and stored in the storage unit 170 last time. Being acquired last time means being acquired from the one previous page. If it is set in the inspection setting received in Step D2 that the continuity inspection is to be performed across a plurality of jobs, the controller 160 determines whether or not an identifier is continuous across a plurality of jobs, the jobs divided in Step D4. If it is not set in the inspection setting received in Step D2 that the continuity inspection is to be performed across a plurality of jobs, the controller 160 determines whether or not an identifier is continuous only in one divided job.

In the inspection process of the present modification example, if the identifier is not continuous (Step D13; NO), the controller 160 may stop the divided job in which the identifier is not continuous, and resume the process from the next divided job.

FIG. 13 illustrates an example in which a divided job whose identifier is not continuous is stopped and the process is resumed from the next divided job.

In the example shown in FIG. 13, an identifier "8" is formed on the first page, an identifier "10" is formed on the second page, and the identifiers are discontinuous in the divided job 2. In this case, upon determination that the identifier on the second page in the divided job 2 is discontinuous, the controller 160 stops the operation of the image forming system 100.

If the setting includes suspension of the job upon the identifier being discontinuous as a result of performing the continuity inspection, the controller 160 stops the divided job 2.

Thereafter, the controller 160 receives the settings of the start number and the end number of the continuity inspection in the divided job 3. In the example illustrated in FIG. 13, the user sets, for example, "12" as the start number and "15" as the end number.

The controller 160 may receive setting of only the start number. In this case, the controller 160 performs the continuity inspection from the start number until, for example, the job is completed or stopped.

The controller 160 may receive the setting of only the end number. In this case, for example, the controller 160 performs the continuity inspection from the number of the identifier acquired first in the resumed job to the end number.

The controller 160 may not receive either the start number or the end number. In this case, for example, the controller 160 performs the continuity inspection from the number of the first acquired identifier in the resumed job until, for example, the job is completed or stopped.

In the example illustrated in FIG. 13, the controller 160 resumes the image formation from the page to which the identifier "12" is given, and resumes the continuity inspection from the page to which the identifier "12" is given. In this case, the controller 160 may form images on the pages with the identifiers "9" and "11" after completion of the divided job 3.

In the inspection process of the present modification example, if the identifier is not continuous (Step D13; NO), the controller 160 may stop the divided job in which the identifier is discontinuous, and execute the interruption job to compensate for the lacking page(s).

FIG. 14 illustrates an example in which a divided job whose identifier is discontinuous is stopped, and an interruption job is performed to compensate for the lacking page(s).

In the example illustrated in FIG. 14, an identifier "9" is formed on the second page, an identifier "11" is formed on the third page, and the identifiers are discontinuous in the divided job 2. In this case, the controller 160 determines that the identifier on the third page of the divided job 2 is discontinuous, and then stops the operation of the image forming system 100.

If the setting includes suspension of the job upon the identifier being discontinuous as a result of performing the continuity inspection, the controller 160 stops the divided job 2.

Next, the controller 160 executes the interruption job including image formation on the pages with the identifiers "10" and "11" and the continuity inspection.

Next, the controller 160 receives the settings of the start number and the end number of the continuity inspection in the divided job 3. In the example illustrated in FIG. 14, the user sets, for example, "12" as the start number and "15" as the end number.

The controller 160 may receive setting of only the start number. In this case, the controller 160 performs the continuity inspection from the start number until, for example, the job is completed or stopped.

The controller 160 may receive the setting of only the end number. In this case, for example, the controller 160 performs the continuity inspection from the number of the identifier acquired first in the resumed job to the end number.

The controller 160 may not receive either the start number or the end number. In this case, for example, the controller 160 performs the continuity inspection from the number of the first acquired identifier in the resumed job until, for example, the job is completed or stopped.

In the example illustrated in FIG. 14, the controller 160 resumes the formation of the image on the page with the identifier "12", and resumes the continuity inspection from the page with the identifier "12".

As described above, the image inspection device (the controller 160) according to the present embodiment inspects a read image acquired by reading a recording medium (sheet) on which an image is formed based on a job. The controller 160 executes a continuity inspection of an identifier included in the inspection region R of the read image. The controller performs the continuity inspection across a plurality of jobs to be inspected.

Therefore, even when the job has been divided, the continuity inspection can be executed across the plurality of divided jobs. Therefore, it is possible to execute the continuity inspection on the job that is not divided, and it is possible to execute the continuity inspection more suitably.

The image inspection device includes a first receiver (controller 160) that receives the setting of the start number of the identifier. The controller 160 executes the continuity inspection from the start number received by the first receiver.

Therefore, it is possible to execute the continuity inspection from the page desired by the user in the job.

The image inspection device includes a second receiver (controller 160) that receives the setting of the end number of the identifier. The controller 160 executes the continuity inspection up to the end number received by the second receiver.

Therefore, it is possible to execute the continuity inspection up to the page desired by the user in the job.

Further, in the image inspection device, when the continuity inspection is executed up to the end number, the controller 160 stops the job under the continuity inspection.

Therefore, for example, when a printing plan of inspecting (printing) a predetermined number of sheets per day is executed, the job can be stopped when inspection (printing) of the predetermined number of sheets is completed. Therefore, it is possible to flexibly address the printing plan.

In the image inspection device, when the continuity inspection is executed up to the end number, the controller 160 stops the job under the continuity inspection.

Therefore, for example, when a printing plan of inspecting (printing) a predetermined number of sheets per day is executed, the job can be suspended when inspection (printing) of the predetermined number of sheets is completed. Therefore, it is possible to flexibly address the printing plan.

In the image inspection device, the controller 160 determines whether or not the identifier is continuous, and if the identifier is determined discontinuous, the controller 160 stops the job in which the continuity inspection is executed.

Therefore, the job is stopped in a situation where the identifier is discontinuous even when the job is redone, so that the amount of wastepaper due to redoing the job can be reduced.

In the image inspection device, the controller 160 determines whether or not the identifier is continuous, and if the identifier is determined discontinuous, the controller 160 suspends the job in which the continuity inspection is executed.

Thus, when the continuity inspection is resumed in response to the resumption of the suspended job, it is not necessary to start the job over again from the beginning, thereby reducing wastepaper.

The image inspection device includes a third receiver (controller 160) that receives a setting as to whether or not to execute the continuity inspection across a plurality of jobs to be inspected. The controller 160 resumes the suspended job and executes the continuity inspection when execution of the continuity inspection is set by the third receiver for the suspended job at startup of the image inspection device.

Therefore, even when the job is suspended in the middle and the power supply of the image forming system 100 is turned off, the continuity inspection can be continuously executed at the next power supply ON (at startup). Therefore, it is possible to flexibly address the printing plan such as inspection (printing) of a predetermined number of sheets per day.

The image inspection device includes a fourth receiver (the controller 160) that receives the setting of the start number and the end number of the identifier. The controller 160 resumes the suspended job and executes the continuity inspection from the start number to the end number received by the fourth receiver.

Accordingly, the job can be suspended in the middle such that the start number and the end number can be set again. Therefore, the number of the identifier for which the continuity inspection is performed can be skipped or duplicated, and the degree of freedom of the continuity inspection can be improved.

In the image inspection device, the controller 160 determines whether or not the identifier is continuous, and if the controller 160 determines that the identifier is discontinuous, the controller 160 performs error notification.

Accordingly, the user can immediately grasp that the identifier is discontinuous from the notification.

In the image inspection device, the controller 160 suspends the continuity inspection of a predetermined job in the middle in response to input of an interruption job that is different from the predetermined job and for which the continuity inspection is not performed.

Therefore, it is possible to flexibly address a printing plan including an interruption job on which the continuity inspection is not set to be performed in the middle of a job on which the continuity inspection is set to be performed.

In the image inspection device, the controller 160 resumes the continuity inspection when the interruption job is ended.

Therefore, when an interruption job for which the continuity inspection is set not to be executed is input, the continuity inspection executed for a predetermined job can be suspended and resumed later. Therefore, printing plans can be made more freely.

The image inspection device includes a fifth receiver (controller 160) that receives a setting of the number of pages in each divided job. The controller 160 divides the job based on the number of pages received by the fifth receiver and executes the continuity inspection across a plurality of divided jobs.

Accordingly, since the job can be divided automatically (by the controller 160) based on the set number of pages, it is possible to save the time and labor of dividing the job in advance.

In the image inspection device, the controller 160 determines whether or not the identifier is continuous, and if it is determined that the identifier is discontinuous, the controller 160 stops the job under the continuity inspection and resumes from the next divided job.

Therefore, even when an identifier is not continuous, when the continuity inspection is resumed from the next divided job, it is not necessary to start the job over again from the beginning, thereby reducing wastepaper.

The image inspection device includes the fourth receiver (controller 160) that receives the setting of the start number and the end number of the identifier. The controller 160 resumes the job from the next divided job and executes the continuity inspection from the start number to the end number received by the fourth receiver.

Accordingly, since the start number and the end number can be set again when the job is resumed, the continuity inspection can be performed again from the page with an identifier that is determined to be discontinuous.

In the image inspection device, in response to input of the interruption job during the continuity inspection of the divided job, the controller 160 suspends the continuity inspection of the divided job and executes the continuity inspection of the interruption job that is different from the continuity inspection of the divided job.

Therefore, it is possible to execute the interruption job for which the continuity inspection is set to be executed. Therefore, for example, when an identifier is discontinuous, it is possible to perform an interruption job that accompanies the discontinuity and compensates for the lack of sheets on which images are formed.

Although the embodiments of the present invention have been described above, the embodiments of the present invention are not limited to the above-described content.

For example, although the controller 160 of the image forming system 100 functions as an image inspection device in the embodiments described above, the present invention is not limited thereto. An external device (e.g., a personal computer) that is configured to communicate with the image forming system 100 may function as the image inspection device.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image inspection device that inspects a read image of a recording medium on which an image is formed based on a job, the image inspection device comprising:
    a hardware processor that inspects a continuity of a plurality of identifiers included in a plurality of the read images which are obtained by reading of a plurality of the recording medium,
    wherein the hardware processor divides the job at a predetermined page, and executes a mode for inspecting the continuity of the identifiers from an intermediate identifier of the predetermined page in the plurality of the identifiers,
    wherein the hardware processor receives a setting as to whether or not to execute the continuity inspection across a plurality of jobs to be inspected, and upon setting to execute the continuity inspection for a job that is suspended on turning on of the image inspection device, the hardware processor resumes the job that is suspended and executes the continuity inspection.

2. The image inspection device according to claim 1, wherein the hardware processor executes a continuity inspection across a plurality of jobs to be inspected.

3. The image inspection device according to claim 1, wherein the hardware processor receives a setting of a start number, and executes the continuity inspection from an identifier corresponding to the start number.

4. The image inspection device according to claim 1, wherein the hardware processor receives a setting of an end number, and executes the continuity inspection up to an identifier corresponding to the end number.

5. The image inspection device according to claim 4, wherein, upon the continuity inspection up to the identifier corresponding to the end number, the hardware processor stops a job under the continuity inspection.

6. The image inspection device according to claim 4, wherein, upon the continuity inspection up to the identifier corresponding to the end number, the hardware processor suspends a job under the continuity inspection.

7. The image inspection apparatus according to claim 1, wherein the hardware processor determines whether or not the identifier is continuous, and upon the identifier being determined to be discontinuous, the hardware processor stops a job under the continuity inspection.

8. The image inspection device according to claim 1, wherein the hardware processor determines whether or not the identifier is continuous, and upon the identifier being determined to be discontinuous, the hardware processor suspends a job under the continuity inspection.

9. The image inspection device according to claim 1, wherein the hardware processor receives a setting of a start number and an end number, resumes the job that is suspended, and executes the continuity inspection from an identifier corresponding to the start number up to an identifier corresponding to the end number.

10. The image inspection device according to claim 1, wherein the hardware processor determines whether or not the identifier is continuous, and upon the identifier being determined to be discontinuous, the hardware processor performs error notification.

11. The image inspection device according to claim 1, wherein the hardware processor suspends the continuity inspection of a predetermined job upon input of an interruption job that is different from the predetermined job and for which the continuity inspection during execution of the continuity inspection for the predetermined job.

12. The image inspection device according to claim 11, wherein the hardware processor resumes the continuity inspection upon end of the interruption job.

13. The image inspection device according to claim 1, wherein the hardware processor receives a setting including a number of pages in a divided job, divides the job based on the number of pages into divided jobs, and executes the continuity inspection across the divided jobs.

14. The image inspection device according to claim 13, wherein the hardware processor determines whether or not the identifier is continuous, and upon the identifier being determined to be not continuous, the hardware processor stops the job under the continuity inspection and resumes a next divided job.

15. The image inspection device according to claim 14, wherein the hardware processor receives a setting of a start number and an end number, resumes the next divided job, and executes the continuity inspection from an identifier corresponding to the start number up to an identifier corresponding to the end number.

16. The image inspection device according to claim 14, wherein, upon an interruption job being input during the continuity inspection of the divided job, the hardware processor suspends the continuity inspection of the divided job and executes a continuity inspection of the interruption job that is different from the continuity inspection of the divided job.

17. An image forming system comprising:
the image inspection device according to claim 1; and
an image forming section that forms an image on the recording medium.

18. A non-transitory storage medium storing a computer-readable program that causes a computer of an image inspection device that inspects a read image of a recording medium on which an image is formed based on a job to:
execute inspection of a continuity of a plurality of identifiers included in a plurality of the read images which are obtained by reading of a plurality of the recording medium;
divide the job at a predetermined page;
execute a mode for inspecting the continuity of the identifiers from an intermediate identifier of the predetermined page in the plurality of the identifiers; and
receive a setting as to whether or not to execute the continuity inspection across a plurality of jobs to be inspected, and upon setting to execute the continuity inspection for a job that is suspended on turning on of the image inspection device, resume the job that is suspended and execute the continuity inspection.

\* \* \* \* \*